United States Patent [19]

Bloise et al.

[11] 4,391,792

[45] Jul. 5, 1983

[54] METHOD FOR OBTAINING PHOTOSTABLE VALENTINITE AND VALENTINITE THUS OBTAINED

[75] Inventors: Rene Bloise, Saint Denis en Val; Marcel Lorang, Orleans; Georges Morizot, Olivet; Genevieve Boissonnade, Le Pecq, all of France

[73] Assignee: Bureau de Recherches Geologiques et Minieres, Paris, France

[21] Appl. No.: 292,054

[22] Filed: Aug. 12, 1981

[30] Foreign Application Priority Data

Aug. 12, 1980 [FR] France ................. 80 17801

[51] Int. Cl.³ ............................................. C01B 29/00
[52] U.S. Cl. .................................................. 423/617
[58] Field of Search ........................................ 423/617

[56] References Cited

U.S. PATENT DOCUMENTS

| | | |
|---|---|---|
| 2,200,478 | 5/1940 | Schirrmeister ................ 423/617 |
| 2,350,638 | 6/1944 | Podschus et al. ............. 423/617 |
| 3,917,793 | 11/1975 | Shafer ........................... 423/617 |
| 3,998,940 | 12/1976 | Shafer ........................... 423/617 |

FOREIGN PATENT DOCUMENTS

| | | |
|---|---|---|
| 16872 | 10/1980 | European Pat. Off. ............ 423/617 |
| 2512502 | 10/1976 | Fed. Rep. of Germany ...... 423/617 |
| 49-118697 | 11/1974 | Japan ................................ 423/617 |

OTHER PUBLICATIONS

Kirk-Othmer, *Encyclopedia of Chemical Technology*, vol. 2, Second Edition (1966), John Wiley & Sons, Inc., pp. 573-574.

*Primary Examiner*—O. R. Vertiz
*Assistant Examiner*—Wayne A. Langel
*Attorney, Agent, or Firm*—Frost & Jacobs

[57] ABSTRACT

The invention relates to a process for obtaining photostable valentinite and to valentinite obtained by said process.

The process consists in carrying out a basic hydrolysis of antimony trichloride at a temperature comprised between about 80° and 100° C. with a weight ratio of $H_2O/Sb_2O_3$ equal to or greater than about 10.

Obtention of photostable valentinite.

4 Claims, 1 Drawing Figure

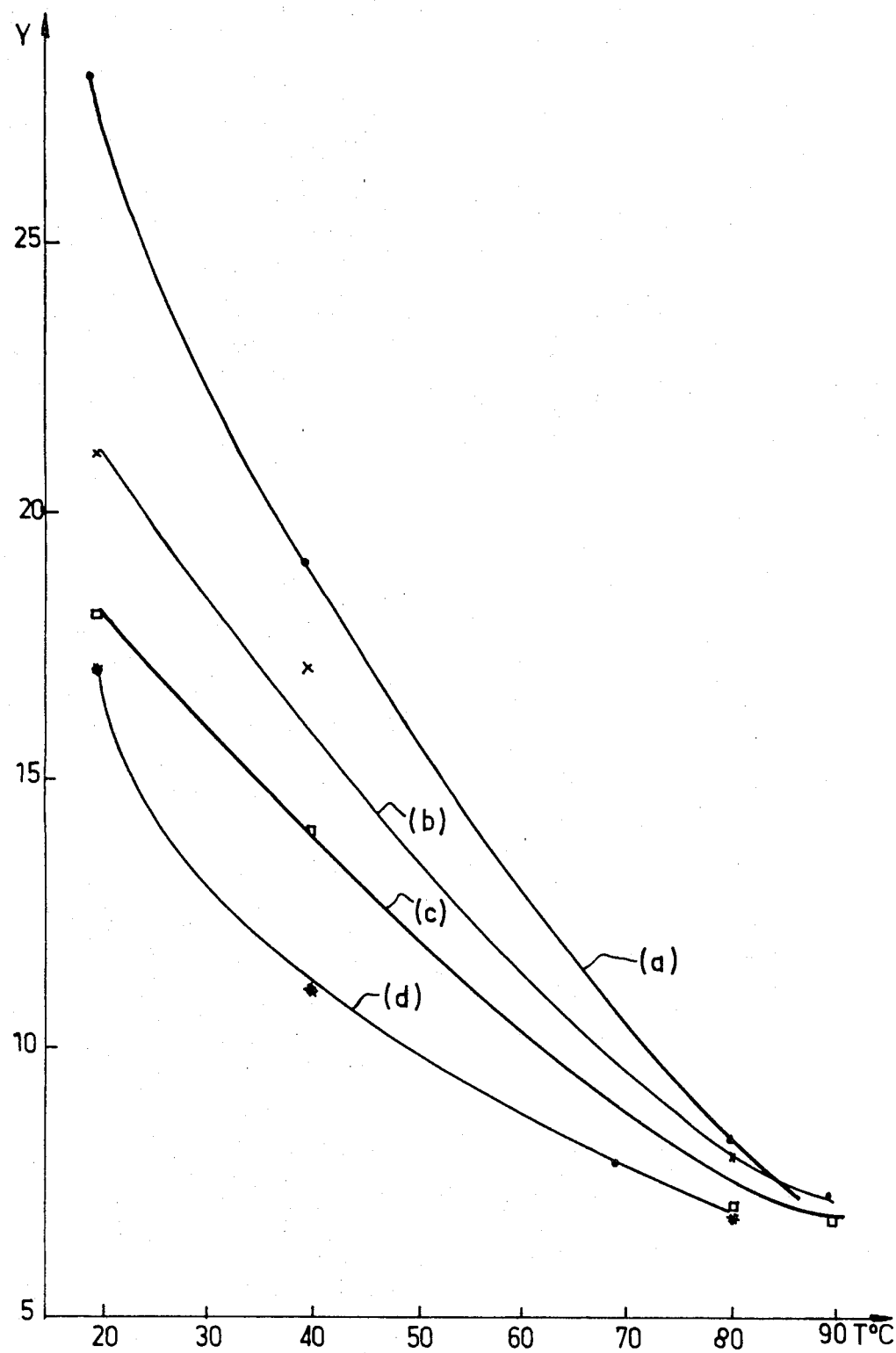

METHOD FOR OBTAINING PHOTOSTABLE VALENTINITE AND VALENTINITE THUS OBTAINED

Applicant, pursuant to 35 USC 119, claims a filing date of Aug. 12, 1980 based upon prior French Application No. 80 17.801 filed on Aug. 12, 1980.

The present invention relates to a process for obtaining photostable valentinite and to valentinite obtained by said process.

Valentinite is one of the polymorphic forms of antimony trioxide. As a matter of fact antimony trioxide exists under two polymorphic forms: the orthorhombic form stable at high temperatures, which is valentinite and the cubic form stable at low temperatures, which is senarmontite.

Antimony trioxide can be made by hydrolysis of antimony trichloride. Depending on the operating conditions for the hydrolysis (dilution of the reaction medium, temperature, proportions of the reagents etc..) antimony oxychlorides or one or other of the polymorphic forms of antimony trioxide are obtained.

The following reactions have been proposed (Hentz et al, J. Chem. Educ. (1975) 52(3)pp 189,190):

$$SbCl_3 + H_2O \rightleftharpoons SbOCl + 2HCl$$

$$4SbCl_3 + 5H_2O \rightleftharpoons Sb_4O_5Cl_2 + 10 HCl$$

$$2SbCl_3 + H_2O \rightleftharpoons Sb_2OCl_4 + 2HCl$$

$$2SbCl_3 + 3H_2O \rightleftharpoons Sb_2O_3 + 6HCl$$

Two defined compounds of formulae SbOCl and $Sb_4O_5Cl_2$ have been identified when hydrolysis is effected at ambient temperature (Lea and Wood J. Chem. Soc.(1924) 125-p 137–148). Before the formation of these stable phases, ill-defined oxychlorides form. These are compounds of formulae $Sb_4O_3(OH)_3Cl_3$ and $Sb_4O_3(OH)_3Cl$. When hydrolysis is effected in very dilute medium, valentinite ($Sb_2O_3$) is formed, on which an adsorption of hydrochloric acid arises.

Belluomini et al (Period. Mineral. (Rome) (1967) 36 pp 147–195) have studied the antimony oxychlorides obtained by hydrolysis at room temperature and at boiling point. At room temperature, two oxychlorides are obtained:

$Sb_4O_5Cl_2$ and the $\gamma$ phase $[Sb_8O_8 (OH)_4][(OH)_{2-x}.H_2O_{1+x}]Cl_{2+x}$.

In table 1, hereinafter, the operating conditions which according to the authors, produce these difference compounds are set out:

TABLE 1

Nature of the different oxychlorides obtained according to the operating conditions:

| Hydrolysis temperature | Nature of formed product | Concentration of Cl ions in Reaction Medium |
|---|---|---|
| 25° C. | $Sb_8O_8(OH)_4[(OH)_{2-x}(H_2O)_{1+x}]Cl_{2+x}$ = "$\gamma$" | 0.006–0.164 |
| 25° C. | "$\gamma$" + $Sb_4O_5Cl_2$ | 0.164–0.214 |
| 100° C. | $Sb_2O_3$ | 0.013–0.059 |
| 100° C. | $Sb_8O_{11}Cl_2$ + $Sb_2O_3$ | 0.036–0.067 |
| 100° C. | $Sb_8O_{11}Cl_2$ | 0.079–0.109 |
| 100° C. | $Sb_8O_{11}Cl_2$ + $Sb_2O_5Cl$ | 0.120–0.177 |

With hydrolysis at the boiling temperature, the different oxychlorides set out above are obtained. However, for high concentrations of chloride ions, an oxychloride of formula $Sb_8 O_{11} Cl_2$, corresponding to the non-hydrated $\gamma$ phase, is obtained, and for low concentrations, antimony trioxide is obtained.

Moreover, it has been observed that, to obtain an antimony trioxide without using a very dilute medium, it was necessary to use a basic medium, which ensured neutralisation of the hydrochloric acid formed in the course of the hydrolysis. The reaction equation is the following one:

$$2SbCl_3 + 6MOH \rightarrow Sb_2O_3 + 6MCl + 3H_2O \quad \text{with}$$
$$M = NH_4^+, Na^+ \text{ etc.}$$

The antimony trioxide thus obtained is generally valentinite which is light-sensible. It changes colour and becomes grayish when exposed to light (Trans Faraday Soc (1940) 36 pp 433–440).

The sensibility can be eliminated by heating in an inert atmosphere at 400°–500° C. or under vacuum at 250° C., but this heat treatment results in an increase in the granulometry of the product.

Different processes for the production of antimony trioxide have been proposed. In this regard, reference can be made to the following patents:

U.S. Pat. No. 3,676,362 discloses a process for producing metal oxide sols in polar organic solvents by reaction of a soluble salt of the metal with water and the ammonia in a liquid solution. This reaction results in a metal oxide in a colloidal dispersion and an insoluble ammonium salt which precipitates and is withdrawn by filtration. It is indicated in this U.S. Pat. No. 3,676,362 that the quantity of water should be at least equal to the stoechiometric quantity required for transforming the metal salt into the corresponding oxide, but it should not be in significant excess relatively to the quantity required to transform the salt into metal hydroxide. The precipitation reaction with ammonia is carried out preferably at a temperature between 0° and 100° C. The ammonia concentration must be lower than the concentration necessary for the complete neutralisation of the chloride anion. A portion of the anion can be left in the dispersion to stabilize the colloidal particles of metallic oxides and to prevent the formation of a gel. This process permits the direct production of a dispersion of metal oxides in an organic solvent, which is also a solvent of polymers such as vinyl polychloride. Its incorporation in these polymers as a fireproofing agent can be readily carried out.

French Pat. No. 72 33 670 (published under No. 2,153,422) and U.S. Pat. No. 3,944,653, deal with the production of antimony trichloride of high purity. It is indicated that the antimony trichloride obtained is an ideal intermediate product for direct transformation into antimony oxide of high purity by hydrolysis in a basic solution. This transformation can be achieved by hydrolysis with an aqueous basic solution of ammonium hyroxide, an alkaline hydroxide, an alkaline carbonate or a similar compound capable of reacting with antimony trichloride to form a solid antimony oxide. Hydrolysis can be done at a temperature between the freezing point and the boiling point of the aqueous solution.

French Pat. No. 74 06 661 (published under No. 2,219,904) deals with the production of antimony oxide (III) which is light-stable, notably senarmontite, by direct hydrolysis of antimony trichloride with a forming agent of antimony complexes, the molar ratio of the antimony trichloride to the reagent being not above 5. Ethylene-diamine-tetraacetic acid, nitrolo-tri-acetic acid, tartaric acid and the polyhydric alcohols, are cited as examples of forming agents of antimony complexes. Hydrolysis reaction is effected between the freezing point and 100° C. at a pH between 7 and 10.

French Pat. No. 74 06,662 (published under No. 2,219,905) deals with a process for producing senarmontite. The process consists in hydrolysing antimony trichloride at a temperature not above 40° C. in an aqueous hydrolysis system containing free chloride ions and having a pH between 7 and 10 and withdrawing the senarmontite from the system.

It is indicated in this patent that high temperatures, weak concentration of chloride ions and a high pH in a hydrolysis system lead to the formation of valentinite, and that low temperatures, low pH and a high concentration of chloride ions in a hydrolysis system lead to the formation of different antimony oxychlorides. Hydrolysis is carried out for between 10 and 30 minutes.

French Pat. No. 857,234 relates to a process for producing valentinite by hydrolysis at a temperature between freezing point and about 35° C., with very high stirring until the formed precipitate is finely crystalline, and subsequent treatment of the product of the hydrolysis with alkaline solutions, for example, solutions of sodium carbonate, and possibly a further heat treatment, for example, at a temperature between 350° C. and 420° C., this treatment being advantageously carried out in the absence of oxygen.

U.S. Pat. No. 2,350,638 also deals with the production of antimony trioxide in the orthorhombic form, which comprises the hydrolysis of the antimony trichloride followed by a treatment with an alkaline solution followed by a heat treatment at a temperature between 300° and 450° C. in excluding oxygen.

DE-OS patent application No. 2,545,221 relates to the production of antimony trioxide from worn antimony V chloride catalysts. The antimony V chloride, after separation of organic products, is reduced to antimony III with sulphur anhydride, antimony, iron or zinc. The compound antimony III is then submitted to an hydrolysis in a reducing and acid medium (for example in the presence of hydrazine, bisulphite, ascorbic acid) which leads to the formation of oxychloride. The hydrolysis may be effected in the presence of a complexant. The resulting oxychloride is then subjected to conventional basic hydrolysis to form an antimony oxide, the crystalline structure of which is not indicated, but which is white and of a "chemically pure" quality.

DE-OS patent application No. 2,733,117 relates to a process of extraction for the recovery of antimony trioxide from sulphured and oxidised mineral ores. The process notably comprises an hydrolysis steps of a solution of antimony III leading to the formation of oxychlorides, followed by a basic treatment.

The abundant state of the art in this field, shows, on one hand, that an antimony trioxide of high purity is always searched, and, on the other hand, that modifications of the operating conditions in the hydrolysis of antimony trichloride have a considerable influence on the properties of the searched product.

The natural valentinite is photostable, while synthetic valentinite obtained by hydrolysis, without special precautions, of antimony trichloride is in general light-sensible, that is to say its colour alters on exposure to light. Such a product is not industrially utilisable as a pigment.

It has been now found a process of direct hydrolysis of antimony trichloride for the obtention of photostable valentinite, having a granulometry suitable for various applications.

The present invention hence relates to a process for the obtention of valentinite by basic hydrolysis of antimony trichloride, which consists in carrying out the hydrolysis at a temperature comprised between 80° and 100° C. with a weight ratio of $H_2O/Sb_2O_3$ equal to or greater than about 10.

Indeed, it was surprisingly found that, when basic hydrolysis of antimony trichloride is carried out with the weight ratio $H_2O/Sb_2O_3$ equal to or greater than 10 and when the hydrolysis temperature is at least 80° C., the yellow index of antimony trioxide, is substantially stable, the obtained antimony trioxide being valentinite.

The hydrolysis temperature is the parameter which has the greatest influence on the photosensibility of the valentinite. As a matter of fact, the higher the temperature the more photostable is the valentinite. However, it was noted that the yellow index, which measures the photosensibility, reaches a constant level for temperatures comprised between 80° and 100° C.

Furthermore, it was noted that, when the hydrolysis duration (or residence time) is low, the granulometry of the resulting product is fine and particularly appropriate for certain conventional uses of the valentinite.

On the other hand, for a given temperature, the photosensibility decreases when the residence time increases. This effect disappears however for higher hydrolysis temperatures (above 80° C.). However, the grain size increases with the residence time.

According to the invention, it is advantageously proceeded at a temperature between 80° and 100° C. with variable residence times according to the desired granulometry.

Hydrolysis is advantageously carried out with continuous stirring. This parameter, that is to say stirring, has no significant influence on the photosensibility.

Tests have indeed shown that stirring does not affect the photosensibility but influences granulometry, and that the average size of the cristals decreases as the speed of stirring increases. Therefore, in order to obtain a fine granulometry it is necessary to quickly stir and, if necessary, to forsee deflectors baffles in the reactor for hydrolysis.

By photostable is meant, according to the invention, the compounds, the yellow index Y of which is between 1 and 10 and do not exceed this upper limit after 48 hours exposure to UV radiation.

The yellow index Y enables a simple comparison to be made of the photosensibility of the antimony trioxides.

The yellow index Y is calculated by the formula:

$$Y = \frac{I \text{ amber} - I \text{ blue}}{I \text{ green}} \times 100$$

in which I is the luminous energy reflected by the sample for various wavelengths of visible light (amber: 580–595 nm; blue 460–480 nm; green: 500–530 nm).

These luminous energies are measured by means of a reflectometer "photovolt 670" (sold by Paris-Labo) on an antimony trioxide pellet. The yellow Y index is measured before and after exposure to UV radiation. The samples are subjected to UV radiation by means of a R 52 lamp ("mineralight" type) of 55 W power (sold by Vilber Lourmat) at a distance comprised between 14 and 18 cm for 24 or 48 hours.

The lower the yellow index, the whiter is the obtained product.

In order to put into practice the process of the invention, the antimony trichloride dissolved in water is introduced into a thermostatically controlled reactor, with agitation, simultaneously with a basic solution. The pulp is preferably continuously withdrawn at a prescribed rate, and then filtered. The filter cake is then washed, preferably in warm water, and dried at around 110° C.

As examples of basic solutions may be used ammoniacal solution, sodium hydroxide solutions, solution of sodium carbonate, and preferably ammoniacal or sodic solutions. The pH of the medium is fixed by the stoechiometry of the reagents.

The amount of reagents to be used must be so determined that the ratio $H_2O/Sb_2O_3$ is equal to or higher than 10. Indeed it has been found that the yellow index does not significantly vary as soon as this ratio reaches the value 10. Above that value, the dilution of the reaction medium is of little importance. Tests carried out with weight ratio of $H_2O/Sb_2O_3$ of 10, 20 and 30, with a residence time of one hour, showed that the obtained valentinite was only lightly photosensible and that the granulometry does not vary much.

The antimony trichloride used may be obtained by different processes. For example, it may be used the antimony trichloride obtained by the extraction process of French Pat. No. 76 08 963 in the name of the applicant. In that case, if the base used for carrying out the basic hydrolysis is ammonia, the filtrate which is a solution of ammonium chloride, may be recycled by conversion into calcium chloride and ammonia by means of limestone, according to the Solvay process.

The calcium chloride so recovered is recycled to the process of selective extraction and the ammonia to the process of the invention. The process of the invention allows photostable valentinite to be produced by a simple manner and without heat treatment, with a yield higher than 99,9%.

The present invention will be now illustrated in greater details by means of non limiting illustrative examples.

EXAMPLES

In a thermostatically controlled and stirred reactor, antimony trichloride and an ammoniacal solution were introduced under the conditions set out in table II below. The temperature of hydrolysis was varied, as well as the residence time, the stirring speed and the weight ratio of $H_2O/Sb_2O_3$. For each test, the yellow index Y of the obtained valentinite was noted immediately after the hydrolysis, and then at 24 and 48 hours thereafter. The granulometry of the product was also indicated by "d" index which shows the amount of valentinite with a granulometry below a prescribed value (expressed in micrometers). For example, $d_{80}=1$ indicates that 80% of the product obtained had a granulometry below 1 μm.

The results in table II show that only at a temperature equal to or higher than 80° C. and at a ratio $H_2O/Sb_2O_3$ above 10 a valentinite of only a low photosensitivity is obtained.

The influence of the residence time and of temperature on the photosensibility of the valentinite obtained according to the invention is indicated in the attached single drawing in which the yellow indices after 24 hours' exposure to UV are plotted as a function of the temperatures of hydrolysis. Each curve relates to a residence time as indicated below:
Curve (a) residence time: 15 mins
Curve (b) residence time: 30 mins
Curve (c) residence time: 60 mins
Curve (d) residence time: 90 mins These curves show that, on one hand, the yellow index decreases as the temperature progressively increases, and on the other hand, that, for a given temperature, decreases as the residence time increases.

Flame behaviour tests carried out in accordance with the standard NST.51.071 on a PVC resin containing 2% by weight of valentinite produced in accordance with the invention showed that the oxygen index was 54 while senarmontite of pyrometallurgical origin has an index of 55.

TABLE II

| Temperature | Average residence time (min) | Speed of stirring | [SbCl₃] M/h | [NH₃] M/h | (Sb₂O₃) M/h | $H_2O/Sb_2O_3$ (mass) | Yellow Index Y Exposure to UV 0 | 24 h | 48 h | $d_{50}$ microns and $d_{80}$ |
|---|---|---|---|---|---|---|---|---|---|---|
| 20 | 15 | 330 | 0.686 | 2.184 | 0.342 | 20 | 5 | 28 | 33 | |
| 20 | 30 | 330 | 0.343 | 1.091 | 0.171 | 20 | 4 | 21 | 25 | $d_{80} = 1$ |
| 20 | 60 | 330 | 0.342 | 1.090 | 0.171 | 10 | 2 | 21 | 23 | $d_{80} = 1$ |
| 20 | 60 | 330 | 0.172 | 0.545 | 0.085 | 20 | 5 | 18 | 23 | |
| 20 | 60 | 330 | 0.114 | 0.364 | 0.057 | 30 | 3 | 22 | 26 | |
| 20 | 90 | 330 | 0.114 | 0.364 | 0.057 | 20 | 1 | 17 | 17 | |
| 40 | 15 | 330 | 0.626 | 2.184 | 0.342 | 20 | 4 | 19 | 25 | |
| 40 | 30 | 60 | 0.343 | 1.091 | 0.171 | 20 | 2 | 15 | 17 | |
| 40 | 30 | 130 | 0.343 | 1.091 | 0.171 | 20 | 3 | 17 | 20 | |
| 40 | 30 | 230 | 0.343 | 1.091 | 0.171 | 20 | 3 | 17 | 19 | |
| 40 | 30 | 330 | 0.343 | 1.091 | 0.171 | 20 | 3 | 12 | 16 | |
| 40 | 60 | 330 | 0.172 | 0.545 | 0.085 | 20 | 3 | 14 | 17 | |
| 40 | 90 | 330 | 0.114 | 0.364 | 0.057 | 20 | 1 | 11 | 13 | |
| 80 | 15 | 330 | 0.686 | 2.184 | 0.342 | 20 | 3 | 8 | 9 | $d_{50} = 1.6\ d_{80} = 4.5$ |
| 80 | 20 | 200–330 | 0.810 | 2.600 | 0.405 | 5 | 3 | 22 | 22 | |
| 80 | 20 | 200–330 | 0.810 | 2.573 | 0.405 | 8.4 | 3 | 20 | 21 | |
| 80 | 20 | 200–330 | 0.364 | 2.108 | 0.182 | 11.3 | 3 | 11 | 11 | |
| 80 | 20 | 200–330 | 0.364 | 1.159 | 0.182 | 20 | 2 | 8 | 9 | |
| 80 | 30 | 330 | 0.343 | 1.091 | 0.171 | 20 | 3 | 8 | 9 | $d_{50} = 1.4\ d_{80} = 5$ |
| 80 | 60 | 330 | 0.342 | 1.090 | 0.171 | 10 | 2 | 7 | 8 | |
| 80 | 60 | 330 | 0.172 | 0.545 | 0.085 | 20 | 2 | 8 | 8 | $d_{50} = 3\ d_{80} = 7$ |
| 80 | 60 | 330 | 0.114 | 0.364 | 0.057 | 30 | 3 | 6 | 7 | $d_{50} = 3\ d_{80} = 7$ |
| 80 | 90 | 330 | 0.114 | 0.364 | 0.057 | 20 | 3 | 7 | 7 | |
| 86 | 15 | 330 | 0.686 | 2.184 | 0.342 | 20 | 2 | 7 | 7 | $d_{50} = 2.6\ d_{80} = 7$ |
| 86 | 30 | 330 | 0.343 | 1.091 | 0.171 | 20 | 3 | 7 | 7 | $d_{50} = 4.7\ d_{80} = 11$ |

TABLE II-continued

| Temperature | Average residence time (min) | Speed of stirring | [SbCl₃] M/h | [NH₃] M/h | (Sb₂O₃) M/h | H₂O/Sb₂O₃ (mass) | Yellow Index Y Exposure to UV | | | d₅₀ microns and d₈₀ |
|---|---|---|---|---|---|---|---|---|---|---|
| | | | | | | | 0 | 24 h | 48 h | |
| 86 | 60 | 330 | 0.172 | 0.545 | 0.057 | 20 | 3 | 7 | 7 | |
| Comparison with two industrial senarmontites from different sources produced by pyrometallurgy | | | | | | | | | | |
| | | | | | SICA* | | 6 | 8 | 9 | d₅₀ = 2.5 |
| | | | | | WHITE STAR** | | 4 | 5 | 6 | d₈₀ = 4 |

*Societe Industrielle et Chimique de l'AISNE
**Sold by Societe LAMBERT-RIVIERE
Concentration M/h = Molar/h

We claim:

1. Process for the production of photostable valentinite by basic hydrolysis of antimony trichloride, characterized in that it consists in effecting the hydrolysis at a temperature between about 80° and about 100° C. with a weight ratio of $H_2O$ to $Sb_2O_3$ equal to or higher than about 10.

2. The process of claim 1 characterized in that the hydrolysis is effected under stirring.

3. The process of claim 2, characterized in that the hydrolysis is carried out with an ammoniacal solution or a solution of sodium hydroxide.

4. The process of claim 3 characterized in that the antimony trichloride in solution in water is introduced at the same time as the basic solution for the hydrolysis, within a thermostatically controlled reactor and under stirring so as to form a pulp, and in that the pulp is continuously withdrawn at a prescribed rate, and then filtered.

* * * * *